Figures 1, 2:
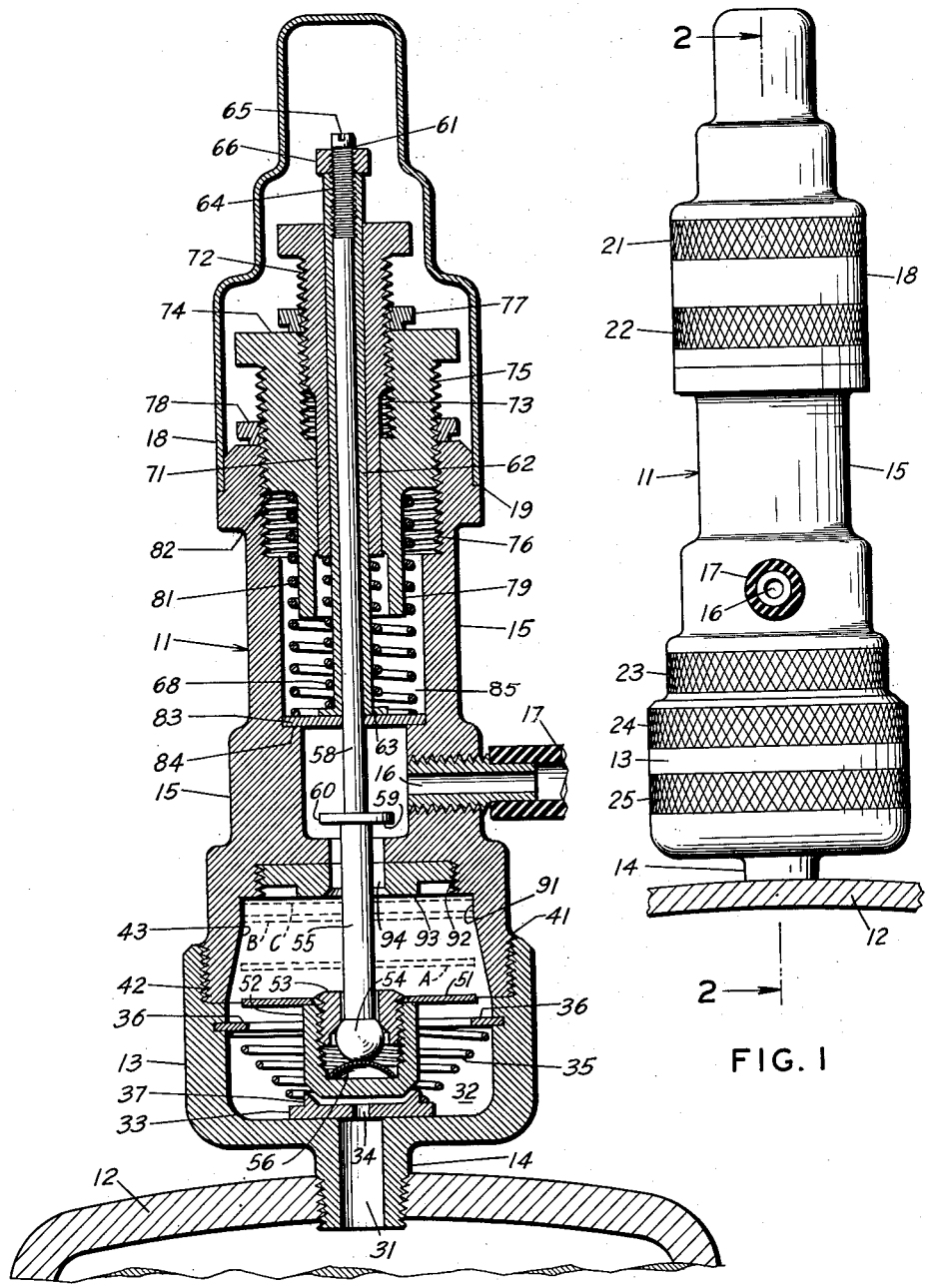

Aug. 19, 1952   B. W. MANTLE   2,607,365
VALVE
Filed July 8, 1946

INVENTOR.
BURR W. MANTLE

BY Wallace and Cannon
ATTORNEYS

Patented Aug. 19, 1952

2,607,365

UNITED STATES PATENT OFFICE 2,607,365

VALVE

Burr W. Mantle, Pittsford, N. Y., assignor to American Brake Shoe Company, Wilmington, Del., a corporation of Delaware Application July 8, 1946, Serial No. 682,060

2 Claims. (Cl. 137—504)

This invention pertains to a valve and particularly to an unloader valve of the type designed for use with fluid compressors and the like.

In order to prevent damage to electric motors of a type commonly used for driving compressors, it is necessary to permit such motors to reach an operating speed where heavy currents of electricity, as are used for example in the starting windings, may be reduced or where special windings may be thrown out of operation before sufficient time has elapsed for the windings to become overheated. While this applies particularly to motors of the alternating current repulsion-induction type, it applies also, although perhaps to a lesser extent, to other electric motors. Most of the various electric motors in use are subject to overheating and damage if operated under heavy load at greatly reduced speeds for appreciable periods of time.

Hence for the purpose of taking the load off a compressor at times when heavy current is being drawn as, for example, during starting, it is desirable to provide a simple and effective mechanism which will be automatic in operation. Various mechanisms have been designed in the past for accomplishing this purpose but some of them have been complex and certain ones have lacked reliability in operation. Compressors such as those used for compressing air for various purposes, and particularly compressors of small or medium sizes driven by electric motors, require a means for relieving the pressure during starting operations. As pointed out above, most electric motors will overheat at low speed and this is particularly true of those provided with auxiliary starting windings which are required to carry large currents of electricity for short periods, the starting torque of the regular operating windings being inadequate. Starting windings of this type are usually not designed for operation over extended periods of time and in fact are commonly subject to overheating and possible burning out if their use is long continued.

Accordingly, it is an object of my invention to unload a compressor of the type mentioned above during starting operations by mechanism which is responsive to the speed at which the compressor is being driven and to the volume of its output, such mechanism permitting compressed fluid to escape until a desired minimum operating speed has been attained.

A further object is to unload a compressor by automatic means during the starting period and to automatically and positively close such unloader when a desired minimum operating speed has been reached.

A still further object is to automatically unload a compressor whenever it is operating below a predetermined minimum operating speed by releasing compressed fluid through means which are responsive to the rate of flow of such fluid, such means being operable to stop such flow when the volume of fluid being compressed per unit of time reaches a predetermined level corresponding to said predetermined speed.

Another object is to unload a fluid compressor or the like by releasing the fluid compressed through a restricted opening in an unloader, which opening is so formed as to become increasingly restricted, and thereby to accelerate a closing operation as the operating speed of the compressor reaches a desired minimum rate. Still another object is to prevent, by positively operating means, the release of fluid through said unloader when the speed of the compressor or the volume of fluid being compressed per unit of time reach predetermined values.

Other and further objects of the present invention will be apparent from the following description and claims and are illustrated in the accompanying drawings which, by way of illustration, show preferred embodiment thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is an elevational view of an embodiment of my invention consisting of a volume responsive unloader; and Fig. 2 is a vertical sectional view on a somewhat larger scale of the mechanism shown in Fig. 1, taken substantially along the line 2—2, Fig. 1.

As shown in Fig. 1, the volume unloader of my invention is indicated generally at 11 and is applied to a part, for example, the cylinder head 12, of a fluid compressor which may be, for example, an air compressor, not shown. The unloader consists of a hollow base member or receptacle 13 provided with a connecting shank portion 14 which contains a fluid passage and is threaded into an appropriate opening in a cylinder head 12 or the like.

Above the base member 13 the unloader includes a body portion 15 formed of suitable material such as metal, or the like, and provided with a threaded opening 16 which may receive a tube or pipe connection 17. If the compressor is used for air, the pipe 17 may be omitted if desired or may lead merely to the atmosphere. If used for other materials where it is not desirable to discharge them to the atmosphere, the pipe or tube 17 may be used to return fluid released therethrough to the low or intake side of the compressor system in order to avoid loss of fluid to the atmosphere. An example of the latter is an application of the unloader to the compressor of a mechanical refrigerator.

The body portion 15 is surmounted by a cap 18 which may be molded or drawn of suitable material, for example, plastic or sheet metal. This cap is designed to cover certain working parts, to be described hereinafter, and it may rest against a shoulder formed on the upper part of the body member 15 as indicated at 19. The cap 18 may be knurled as at 21, 22 and the body member may be knurled as at 23. The base member 13 may be knurled as at 24, 25, for holding manually when the various parts are assembled or disassembled.

The internal construction of my improved unloading valve mechanism is clearly shown in section in Fig. 2. Below the cylinder head or the like, 12, a compressor piston or equivalent element, not shown, may be operating, or a rotary type compressor unit may be used, the operation of the unloader being suitable for either type.

The shank portion 14 of the base member 13 is provided with an internal passage 31 for fluid which passage may be of a size adequate to permit flow of fluid without material resistance up to the minimum operating speed of the compressor. At such speeds, where the compressor is driven by a repulsion-induction type motor, the counter-electromotive forces in the motor are such as to prevent the flow of excessive current in the running windings, and the starting windings are normally thrown out of operation. In general, the same considerations apply to other types of electric motors so there is little danger of damage after an operating speed of 75 to 90 percent of full speed is reached.

The passage 31 leads to a pressure chamber 32, the lower part of which is formed within the enlarged upper portion of the base member 13. Above the shank 14 and within the pressure chamber 32, the opening 31 is partly closed by a disk element 33 which is provided with a central perforation 34. This disk 33 is normally held down against the bottom of the pressure chamber 32 and in position to partly close the port 31 by a coil spring 35, the upper end of which is held down by an inwardly projecting flange or ring member 36 suitably secured to the interior side walls of the base member 13. The lowermost turn of the spring 35 surrounds an upwardly projecting flange 37 on the disk 33 and thus holds it in a position directly over the opening 31. The perforation or opening 34 in the disk 33 is of a size to permit a certain restricted flow of fluid, such as compressed air, for a purpose which will be described hereinbelow.

The body member 15 is threaded externally as at 41 to fit within internal threads 42 of the base member 13. The lower annular wall portion of body member 15 is tapered, as indicated at 43, to form a converging chamber toward the top of recess or chamber 32. The space thus surrounded by the tapered wall portions 43 and by the upper part of the base member 13 comprises a pressure chamber which is designed to operate certain valve mechanism next to be described.

A floating valve member consists of a disk 51 positioned transversely within the pressure chamber 32 and of such a diameter as to permit restricted flow of fluid about its edges and within the tapered walls 43. The disk is secured to a cup shaped member 52 which is threaded internally to receive a threaded retainer 53 for the enlarged head 54 of a vertical rod or sleeve 55. A resilient disk 56 is provided in the bottom of cup 52 and this serves to support the head 54 of rod 55 when the threaded retainer 53 is tightened into the cup. By these means the disk 51, cup 52 and rod 55 are secured together, certain resilience between them being provided to prevent shock to operating parts as the valve is quickly closed or opened.

The valve rod or stem 55 consists of the lower portion to which the valve disk is attached and an upper portion 58 of somewhat smaller diameter than the lower part. At the shoulder 59 where these two parts join, a washer 60 is slidably mounted on the rod. The upper end of the rod is threaded externally as indicated at 61 and a sleeve element 62, provided with a flanged base portion 63 at its lower end, is threaded internally at its upper end, as shown at 64, to receive the threaded portion 61 of the rod or stem 55. The upper end of the stem 55 is slotted or notched as indicated at 65 to receive a screw driver or like tool for adjusting the stem longitudinally with respect to the sleeve element 62. A lock nut 66 is threaded on to the rod or stem 55 and serves to lock these parts in any adjusted position.

By the construction just described, vertical movement of the disk 51 is accomplished by similar movement of the rod or stem 55, the washer 60 and the flanged sleeve 62, these parts all being secured together. Such movement is restricted by a light coil spring 68, the lower end of which rests on the flange 63. The upper end of spring 68 is held down by the lower end of a vertically adjustable sleeve or bushing member 71. This member is provided externally with threads 72 which fit into internal threads 73 of another sleeve or bushing member 74. The bushing member 74 likewise is externally threaded as shown at 75 to be screwed into internal threads 76 formed in an upper recess in the body member 15. A lock nut 77 is provided to hold the sleeve 71 in adjusted relation with respect to the outer sleeve 74. Likewise, a lock nut 78 is provided to hold the sleeve 74 in adjustment with respect to the body member 15.

The bushing or sleeve member 74 has a downwardly projecting hollow shank portion 79 which surrounds the light coil spring 68 and is surrounded by another and much heavier coil spring 81. The upper end of the coil spring 81 abuts against a shoulder 82 formed on the bushing or sleeve member 74. The lower end of this spring rests on a washer 83 which sets against a shoulder 84 formed in the bottom of a recess 85 in the upper part of the body member 15.

The parts just described are so assembled that the rod or stem 55 and the associated parts, including the flow restricting valve disk 51, tend to be held down by the light coil spring 68. Tension on this spring is adjusted, as noted above, by adjustment of the sleeve member 71. Tension on the heavy spring 81 which holds down the disk or washer 83 is adjusted by turning the bushing or sleeve member 74 in the threads formed in the body member 15.

In addition to the tapered wall portion 43 mentioned above, the recess in the lower end of the body member 15 comprises a cylindrical portion 91 which is very slightly larger in diameter than the valve disk 51, and an internally threaded recess 92 for a valve seat member 93. The valve seat member is provided with a central aperture 94 which is large enough to provide a port for fluid flow around the stem 55, as will be described hereinbelow. The valve disk 51 is adapted to seat against the seat 93 when in its fully raised position. In such position it prevents further flow of fluid, such as compressed air, through the unloader.

The cup member 52 at the lower end of the valve stem 55 is also positioned above the disk 33 a distance at least sufficient to permit the free flow of fluid from the compressor through the port 34 in disk 33. Flow of fluid, when the unloader is operating, is upwardly through the passage 31, through the port 34, or under the disk 33 if the latter is raised due to pressure in the compressor, thence upwardly through the pressure chamber 32, through the washer 36, around the outer edges of the disk 51, through the aperture 94 surrounding the valve stem, and thence out through the opening 16 to the tube 17 and to the atmosphere or to the low side of the compressor.

The opening 34 is smaller in effective cross section than the aperture 94 and the aperture 94 is slightly larger than the outlet port 16. The opening 34 is of such a size that fluid forced into the chamber 32 cannot all flow back into the compressor during a single cycle thereof when the compressor is operating above starting speed. Fluid may be forced into the chamber 32 by the compressor more easily, however, because the disk 33 acts somewhat as a check valve, permitting a large inflow from below but restricting flow from above. The result is that at least some pressure is maintained within the chamber 32 under all operating conditions although when the compressor is being operated slowly this pressure may be very small.

When the pressure in the chamber 32 is very low, as it is when the compressor is just starting, fluid flows gently around the edges of the valve disk 51 and out through the openings 94 and 16, very little load being imposed on the compressor. As the speed increases, the pressure in chamber 32 increases very gradually at first, but when the velocity of flow past the disk 51 becomes sufficient to start lifting this disk against the tension of the light spring 68, the valve is quickly closed. This occurs in the following manner:

As the disk 51 begins to rise with respect to the tapered surrounding walls 43 to a position, for example, shown in dotted lines at A (Fig. 2) the passage for fluid around its edges is reduced in cross section and this immediately results in further and accelerated movement of the disk upwardly. As the disk reaches the position indicated at B, Fig. 2, its edges are almost, though not quite in contact with the interior cylindrical surface of the wall portion 91, and pressure builds up very rapidly within the pressure chamber. At this point the washer 60 on the valve stem contacts the washer 83 which is held down by the strong spring 81 mentioned above. Nevertheless, the pressure on the disk 51 is sufficient now to overcome the force of the strong spring 81 and thereupon the washer 83 is moved upwardly and the valve disk 51 quickly and firmly seats against the seat member 93, completely stopping further flow of fluid through the unloader. This operation may occur within a single cycle of the compressor, hence the opening and closing of the unloader is very rapid and in fact, almost instantaneous. But it does not occur until a minimum predetermined operating speed has been attained such that the regular operating windings of the driving motor may carry the load, permitting the starting windings to be thrown out of operation.

During regular operation of the compressor, the unloader remains closed and no fluid escapes through the unloader. The valve seat 93 is replaceable if wear should occur permitting leakage through the ports 94 and 16. When the compressor is being shut down, an operation somewhat the reverse of the above occurs as will now be described.

As the operating speed of the compressor becomes less and less, and reaches a point where the pressure in the pressure chamber 32 may be materially reduced during a single cycle by outward flow of fluid through the small port 34, a sufficient reduction in this pressure permits the strong spring 81 to snap the valve disk 51 from its uppermost position, indicated at C, Fig. 2, to an intermediate position as at B. At the same time, the light spring 68 tends to force the disk 51 back to its extreme lower position where it is shown in full lines in Fig. 2. At the point where the flow of fluid is not sufficient to overcome these springs the valve is quickly opened to the full position and thereupon the unloader is thrown into full operation. Hence during both starting and stopping operations the unloader operates to take an undesirable load off the driving motor. The operation is very rapid in either case, occurring substantially during one operating cycle of the compressor.

If the output side of the unloader described above is connected to the intake side of the same compressor stage the device operates on a pressure differential between the discharge pressure of the particular compressor stage and the inlet pressure of the same stage or cylinder on which the unloader is placed. Hence if this device is employed at the second stage of a two stage compressor, the operating range for the unloader is between the output pressure of the first stage and the output pressure of the second stage to which the unloader is attached. Hence it will be understood that the device is not necessarily limited in use to a single stage compressor and in fact, it may be placed on either or both stages.

By means of the adjustments provided, as described above, the unloader can be adjusted for use over a wide range of compressor capacities. Their range can be further extended by the substitution of elements such as the disk 33 and the valve seat member 93 having orifices of different sizes to respond to different speeds of operation or to different volumes of compressed fluid delivered per unit of time. For certain purposes the adjustable features for spring tension may be eliminated thus simplifying the construction to some extent if it is found that the device will be operated over a substantially constant range or with a particular type of compressor unit. Thus in some cases a simple unit, where the springs 68 and 81 abut against fixed elements rather than against adjustable sleeves such as 71 and 74, may be distinctly advantageous. In other cases, it will be found desirable to retain the adjustable features since they permit use of the unloader with various compressor units and for various operating ranges in speed, volume, and pressure.

While I have described the above invention in connection with an air compressor, it will be understood that it may be used with various other types of mechanisms wherever fluid is being compressed at a stage of an operation, and where it is desirable to relieve the working load imposed on a driver by unloading the fluid compression stage.

Hence, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In an unloader of the character described comprising a base and body means affording a pressure chamber having end walls and a side wall of generally cylindrical form, an inlet port provided in one of the end walls and opening into the pressure chamber, an outlet port in the other of the end walls and leading from the pressure chamber, said pressure chamber having a conical portion converging toward the outlet port, a valve member carried at one end of a valve stem that is centrally mounted in the body means for vertical shifting movement, the valve member being positioned transversely in said chamber for sliding movement axially thereto and adapted to move between the ports, the valve member comprising a disc-like element adjacent its top, the disc-like element having a diameter slightly smaller than the smallest diameter of the said conical portion, the valve stem being of a length corresponding substantially to that of the body means and extending through the outlet port, a washer slidable in the body means and restable on an abutment afforded internally of the body means above the outlet port, a first elongated sleeve adjustably mounted in the body means concentric to the valve stem and compressing a first spring against the washer, the said first spring being concentric to the valve stem, abutment means carried by the valve stem above the outlet port and below the washer and adapted to move with the valve stem into engagement with the washer whereby the valve stem is moveable against the action of the said first spring, a second elongated sleeve adjustably mounted in the first sleeve and being concentric to the valve stem, a third elongated sleeve slidably mounted in the second sleeve and being in concentric free engagement with the upper extension of the valve stem, the lower end of the third sleeve being freely engageable with the top surface of the washer, a second spring concentric to the upper extension of the valve stem and urging the lower end of the third sleeve into engagement with the top surface of the washer, the first spring being concentric to the second spring, the second spring being held compressed by the lower end of the second sleeve, the upper end of the valve stem being threaded to the upper end of the third sleeve whereby the valve stem is adjustable in the third sleeve, the distance between the said abutment means and the said washer being less than the distance between the said disc-like element and the outlet port, the second spring being more readily compressible than the first spring.

2. In the unloader according to claim 1, a check valve in the pressure chamber overlying the inlet port and being in alignment with the bottom of the valve member.

BURR W. MANTLE.

REFERENCES CITED

The following references are of record in the file of this patent:

UNITED STATES PATENTS

| Number | Name | Date |
| --- | --- | --- |
| 2,057,624 | Burkhart | Oct. 13, 1936 |
| 2,100,805 | Hufford | Nov. 30, 1937 |
| 2,404,924 | Sacchini | July 30, 1946 |